United States Patent
Ye et al.

(10) Patent No.: US 9,658,934 B2
(45) Date of Patent: May 23, 2017

(54) DYNAMIC MECHANISM FOR FAULT INJECTION FOR TESTING DISTRIBUTED SYSTEMS

(71) Applicant: VMware, Inc., Palo Alto, CA (US)

(72) Inventors: Ruopeng Ye, Palo Alto, CA (US); Victor Golosovker, Union City, CA (US); Ilia Langouev, Santa Cruz, CA (US); Aleksey Pershin, Fremont, CA (US); Bin Wang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 57 days.

(21) Appl. No.: 14/841,550

(22) Filed: Aug. 31, 2015

(65) Prior Publication Data
US 2017/0060715 A1    Mar. 2, 2017

(51) Int. Cl.
*G06F 11/263*  (2006.01)
*G06F 11/22*  (2006.01)
*H04L 12/26*  (2006.01)
*H04L 29/08*  (2006.01)

(52) U.S. Cl.
CPC ........ *G06F 11/263* (2013.01); *G06F 11/2205* (2013.01); *G06F 11/2294* (2013.01); *H04L 43/50* (2013.01); *H04L 67/2895* (2013.01)

(58) Field of Classification Search
CPC ............... G06F 11/263; G06F 11/2205; G06F 11/2294; H04L 43/50; H04L 67/2895
See application file for complete search history.

(56) References Cited

U.S. PATENT DOCUMENTS

| | | | | |
|---|---|---|---|---|
| 6,862,698 B1* | 3/2005 | Shyu | ............... | G06F 11/0709 709/224 |
| 8,996,921 B2* | 3/2015 | Saltzman | ........... | H04L 67/2804 714/38.1 |
| 9,465,668 B1* | 10/2016 | Roskind | ............... | G06F 9/5072 |
| 2005/0010661 A1* | 1/2005 | Southam | ............ | H04L 12/2697 709/224 |
| 2010/0325615 A1* | 12/2010 | Ramot | ............... | G06F 11/3672 717/124 |
| 2015/0100679 A1* | 4/2015 | Chandaka | .............. | H04L 67/22 709/224 |

OTHER PUBLICATIONS

Apache Fault Injection Framework (http://hadoop.apache.org/docs/r2.4.1/hadoop-project-dist/hadoophdfs/FaultInjectFramework.html); retrieved from the Internet on Jul. 30, 2015.
JBoss Byteman (http://byteman.jboss.org/); retrieved from the internet on Jul. 30, 2015.

(Continued)

*Primary Examiner* — Yolanda L Wilson

(57) ABSTRACT

A distributed system and method for error handling testing of a target component in the distributed system uses a proxy gateway in the target component that can intercept communications to and from remote components of the distributed system. When a proxy mode of the proxy gateway in the target component is enabled, at least one of the communications at the proxy gateway is modified to introduce an error. When the proxy mode of the proxy gateway in the target component is disabled, the communications to and from the remote components of the distributed system are transmitted via the proxy gateway without modification.

19 Claims, 5 Drawing Sheets

(56) References Cited

OTHER PUBLICATIONS

Sanches et al., "J-SWFIT: A Java Software Fault Injection Tool," 5th Latin-American Symposium on Dependable Computing (LADC), pp. 106-115, 2011.
JACA (http://www.ic.unicamp.br/~eliane/JACA.html); retrieved from the Internet on Jul. 30, 2015.
Hoarau, William et al., "Fault Injection in Distributed Java Applications," IEEE; 11 pages, 2006.

* cited by examiner

DYNAMIC MECHANISM FOR FAULT INJECTION FOR TESTING DISTRIBUTED SYSTEMS

BACKGROUND

Error handling is an important aspect in the implementation of a distributed system in which various interdependent components operate. When a fault occurs in one component running in the distributed system, the other remote components running in the distributed system that depend on the faulty component should not crash due to the faulty component. Rather, the other remote components should be able to handle the errors from the faulty component gracefully, for example, by releasing any impacted resources and properly reporting the errors.

However, testing error handling in a component of a distributed system is usually difficult because the other remote components may be either not open or not suitable to modification for testing. A solution for testing error handling in such a situation is using a fault injection technique that does not require modifying the remote components. One possible approach to fault injection is to introduce some form of a network proxy component that is capable of injecting faults into the network calls. Unfortunately, such a proxy can introduce unnecessary delays and complicate the way components are registered with each other. What is more important, a network proxy can simulate only very simplistic failure scenarios, such as dropped network packets and failed calls. More sophisticated failure scenarios, such as returning incorrect/unexpected results or failing tasks produced by asynchronous calls, are usually not possible to simulate through a network proxy.

BRIEF DESCRIPTION OF THE DRAWINGS

Throughout the description, similar reference numbers may be used to identify similar elements.

DETAILED DESCRIPTION

Figure 1:
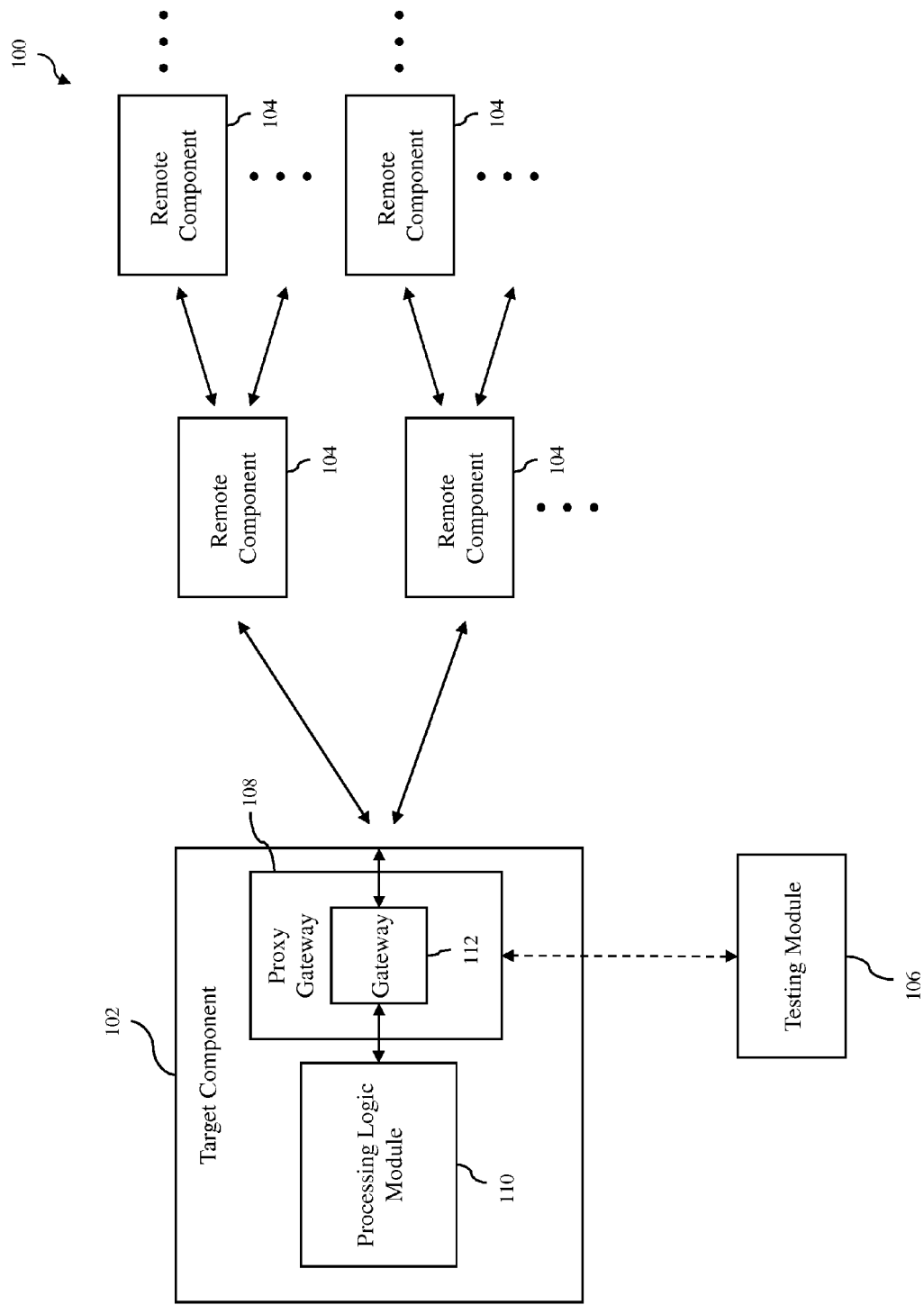
FIG. 1 is a block diagram of a distributed system with multiple components in accordance with an embodiment of the invention.

FIG. 1 depicts a distributed system 100 with multiple components 102 and 104 in accordance with an embodiment of the invention is shown. These components may be any processing entities, such as physical application specific devices, computer systems or software applications running on computer systems. In the illustrated embodiment, the component 102 is a target component that can be tested for error handling using a testing device 106. The target component is dependent on the other "remote" or external components 104 for its operation. The other components are considered as being "remote" because these components may not reside with the target component and communications between the target component and the remote components are typically accomplished through one or more computer networks. In addition, in the illustrated embodiment, the remote components will be considered to be unmodifiable. This may be due to the fact that the remote components are not open or accessible for modification or are not suitable for modification for various reasons. Thus, the remote components can be viewed as a black box for the purpose of testing the target component for error handling.

Conventional error handling testing methods may involve using a network proxy situated between a target component and a remote component to inject faults to see how the target component handles the injected faults. However, as previously noted, a network proxy can introduce unnecessary delays and complicate the way components are registered with each other. Also, a network proxy can simulate only very simplistic failure scenarios, such as dropped networks packets and failed calls, because the network proxy operates at the network layer and will not know all the application layer protocol details. Furthermore, communication channel between the target component and the remote components may be encrypted and authenticated, which makes it very hard for the network proxy to inspect the transmitted data and make modifications. Thus, a network proxy cannot simulate more sophisticated failure scenarios, such as returning incorrect/unexpected results or failing tasks produced by asynchronous calls.

Other conventional error handling testing methods may involve modifying the remote component to inject faults to see how the target component handles the injected faults. One such method is Apache Fault Injection Framework. This solution uses Aspect-Oriented Programming (AOP) technique, which requires modifying the remote component (the one being called). This modification is done by the AOP compiler. However, this solution is often not possible to implement, especially if the remote component is already deployed in a distributed system. Furthermore, if there is no access to the remote component's source code (or byte code for Java), it is not possible to recompile the remote component using AOP.

Another conventional method is JBoss Byteman. This solution requires a Byteman agent to be installed at the same machine where the remote component is installed. The Byteman agent injects special byte code into the remote component for fault injection. However, this solution requires modifying the remote component, which may not be possible or practical.

Other conventional methods that require remote component modification include Java Software Fault Injection Tool (J-Swift), JACA and Fault Injection Language-FAIL Cluster Implementation (FAIL-FCI). However, these methods also suffer from the disadvantages explained above.

As described in more detail below, the fault injection solution used in the distributed system 100 does not involve modifying any of the remote components 104 or using a network proxy situated between the target component 102 and the remote components. Rather, the distributed system 100 uses a proxy gateway 108 in the target component to inject faults and overwrite interactions with external components for testing fault handling. This solution does not require modification of any of the remote components. Consequently, the remote components can be considered as a set of black boxes, and thus, the solution does not need any intimate knowledge regarding the operations of the remote components. In addition, this solution allows for simulation of sophisticated failure scenarios, such as returning incorrect/unexpected results or failing tasks produced by asynchronous calls.

As shown in FIG. 1, the target component 102 of the distributed system 100 includes a processing logic module 110, a gateway 112, and the proxy gateway 108. The target component may be implemented in any combination of software, hardware and firmware. In one embodiment, the target component is implemented as one or more software programs running on a physical computer system with one or more processors, memory and other computer components commonly found in a personal computer or a physical server.

The processing logic device 110 of the target component 102 operates to execute tasks to accomplish one or more operations. These operations can be any type of operations that require communications with one or more remote components 104. These operations may require synchronous and/or asynchronous operations. A synchronous operation involving one or more remote components requires a requested task to a remote component to be finished before handling another task. Thus, a synchronous operation requires a synchronous outgoing communication or call to be made to a remote component and then waiting for a response indicating that the requested task or process is finished before moving to the next task or process. An asynchronous operation involving one or more remote components does not requires a requested task to a remote component to be finished before handling another task. An asynchronous operation only requires the initiation of a task. Thus, an asynchronous operation only requires an asynchronous outgoing communication or call to be made to a remote component. There is no need to wait for the completion of the requested task before moving on to another task or process. As an example, the operations performed by the processing logic device may involve orchestrating disaster recovery workflows from an on-premise datacenter to a cloud computer environment and back, which may include planned failover, forced failover, test failover, or other disaster recovery processes. These operations may include both synchronous and asynchronous operations. As described in more detail below, the error handling ability of the processing logic device can be tested via dynamic fault injection using the proxy gateway 108.

The gateway 112 of the target component 102 operates to facilitate making or sending remote communications or calls to the remote components 104 and receiving remote communications, calls or results from the remote components. In an embodiment, the gateway is a thin layer responsible for assembling network requests in the proper format according to the remote call being sent or for disassembling network requests in any incoming remote calls. This type of gateway is sometimes known as a "stub layer". The gateway includes an interface to communicate with the remote components. The interface of the gateway is configured to communicate with similar interfaces in the remote components. In some embodiments, the interface of the gateway is written in the programming language native to the target component. As an example, if the target component is written in Java, the interface of the gateway may be a Java interface. In operation, when the target component, i.e., the process logic module 110, calls the gateway to make a remote call, the gateway will take the parameters from the target component and convert them into the appropriate network request. As an example, for REST API, the gateway would convert it to an HTTP/HTTPS request to provide data security and prevent an attacker from modifying the transmitted data. As another example, for a SOAP call, the gateway would convert it to an XML request and then send it over a HTTP/HTTPS channel. Thus, the gateway can be viewed as a converter of a network communication message from one type of network call or communication to another type of network call or communication, which may vary in communication protocol.

The proxy gateway 108 of the target component 102 operates to intercept communications or calls being sent from or to the target component so that error handling testing can be performed on the target component. The proxy gateway can be designed so that the processing logic module 110 and the gateway 112 of the target component do not have to be modified to accommodate the proxy gateway. The proxy gateway is configured so that outgoing communications from the processing logic module and incoming communications from the remote components 104 are first received by the proxy gateway. During non-proxy mode or normal mode, i.e., when a proxy mode of the proxy gateway is disabled, all communications from the processing logic module and from the remote components are transmitted via the proxy gateway without modifications. Thus, in this mode, the target component operates in a normal mode of operation. However, during proxy mode or testing mode, i.e., when the proxy mode of the proxy gateway is enabled, the communications from the processing logic module or from the remote components can be modified to introduce errors to see how the processing logic module handles or responds to these errors.

In an embodiment, the proxy gateway 108 is implemented as a piece of code in the form of a small wrapper that wraps the gateway 112 and provides the same Application-Programming Interface (API) interface as the gateway. From the perspective of the component being tested, i.e., the target component 102, the proxy gateway is the only interface to communicate with any of the remote components 104. Thus, all API calls to the remote components have to go through the proxy gateway. In some embodiments, a call to the proxy gateway's API may either be delegated to the original gateway, which will forward the request to the corresponding external component (unmodified behavior), or be served entirely by the proxy gateway to emulate the external component. Since the proxy gateway has exactly the same API as the gateway it wraps, the code of the target component does not need to be changed to use the proxy gateway.

If the programming language supports run time code injection (for example, Aspect Oriented Programming in Java), the proxy gateway 108 can be injected into the target component 102 by simply changing a configuration file and restarting the target component. However, if the programming language does not support run time code injection (for example, C++), the proxy gateway can be compiled into the target component based on the compilation settings. Either way, the proxy gateway can be designed in such a way that the proxy gateway would be present only in the testing environment but not in the production code running in the user environment.

In order to control the behavior of the proxy gateway 108, the proxy gateway includes a backdoor mechanism to allow the testing module 106 access to the proxy gateway. The backdoor mechanism allows the testing module to enable or disable the proxy mode of the proxy gateway. The backdoor mechanism also allows the testing module to modify communications to the remote components 104 before the communications are sent or to inject fake or modified communications that appear to be from the remote components in order to create or induce faults.

In an embodiment, the proxy gateway 108 has several backdoor APIs that are used to enable or disable the proxy mode and specify how some APIs should be modified. In the proxy or testing mode, all calls to the APIs are supervised by the proxy gateway. For example, a configurable fault can be injected if certain criteria for the API input parameters are met, or the input or output of the API can be modified based on rules that have been passed to the proxy gateway through the backdoor APIs by the testing module 106. In the non-proxy or normal mode, all calls to the APIs will be delegated from the proxy gateway to the original gateway 112 without any modification. Since all API calls to the remote components 104 go through the proxy gateway, the proxy gateway can emulate any error condition that could have been exhibited by the remote components without the need to modify the remote components. Thus, different faults can be easily induced using the proxy gateway. For example, a "not-found" fault can be induced by instructing the proxy gateway to modify the API call input parameter before sending the modified call to a remote component and then let the remote component fail the call. As another example, a "timed-out" fault can be induced by adding an artificial delay in the proxy gateway API call, wherein the artificial delay exceeds the time out duration for receiving a response.

An advantage of using backdoor APIs to control the proxy gateway's behavior is that there is no need to change the target component's logic or any logic of the remote components. Only a test code running in the testing module 106 needs to be changed to make the appropriate calls to the proxy gateway backdoor APIs prior to making any public API calls to the target component being tested. Furthermore, the test code does not need to know how exactly the remote components would fail in a particular situation. The test code can simply instruct the proxy gateway to modify the input parameters, for example, change the value of an input parameter of a call (e.g., an identification (ID) of some object) to be performed by a remote component in a pre-defined manner (e.g., random), and let the remote components generate the necessary faults in response to the calls.

The testing module 106 of the distributed system 100 operates to control the proxy gateway 108 to control fault injection into the target component 102. The testing module is configured to execute a testing process by accessing the proxy gateway via the backdoor mechanism of the proxy gateway. As explained above, the testing module may instruct the proxy gateway to modify communications between the target component 102 and the remote components 104 to induce errors. The testing module may also inject artificial or fake error communications into the target component, where the communications appear to have originated from the remote components.

The testing module 106 may provide a user interface, such as a graphical user interface, that allows a user to initiate the testing process. The user interface may also allow the user to change any parameters, settings or rules of the testing process and may also allow the user to modify the testing process.

The testing module 106 may be implemented in any combination of software, hardware and firmware. In one embodiment, the testing module is implemented as one or more software programs running on a physical computer system with one or more processors, memory and other computer components commonly found on a personal computer or a physical server.

Figure 2:
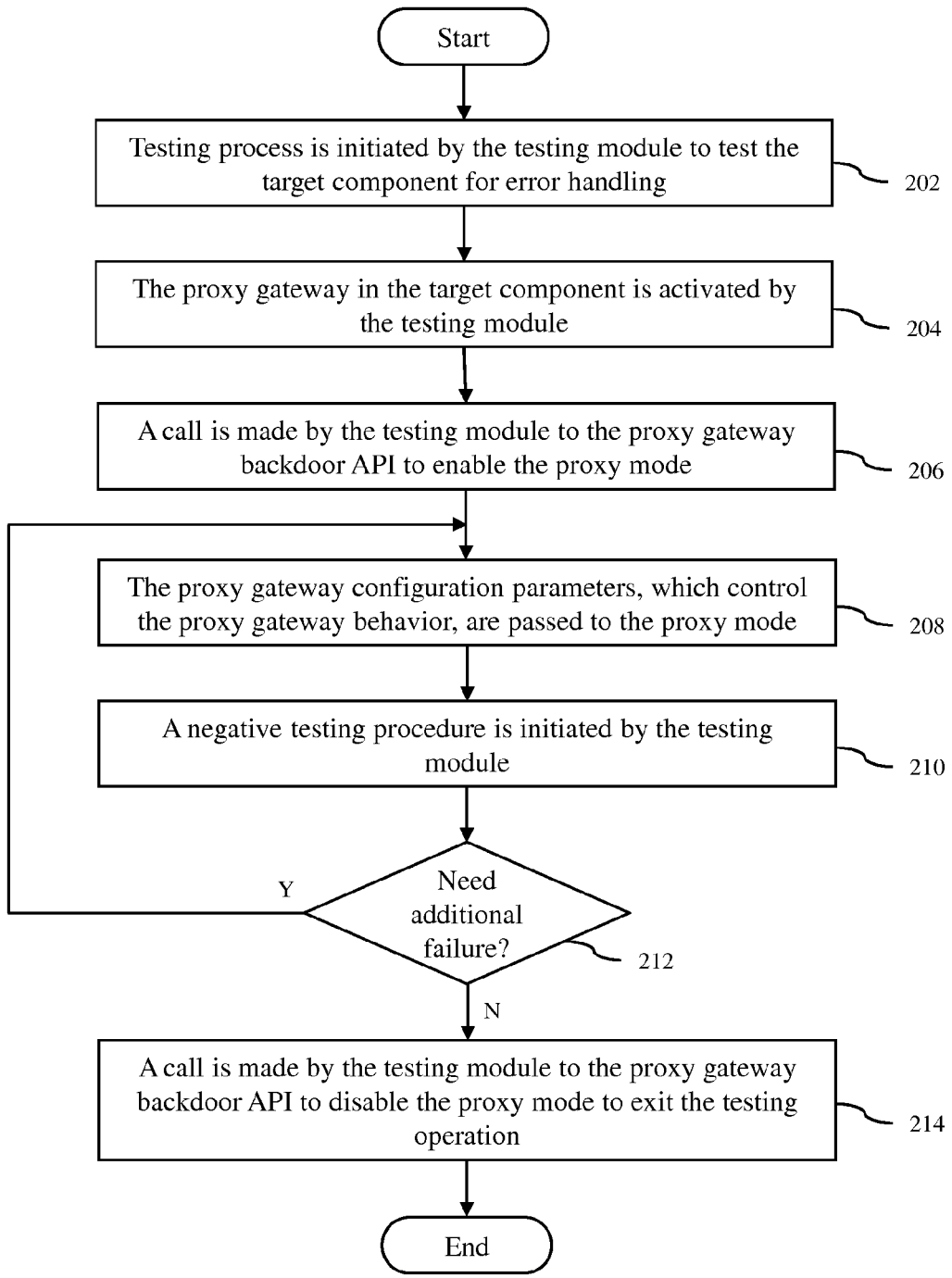
FIG. 2 is a flow diagram of an operation of a testing module in accordance with an embodiment of the invention.

The operation of the testing module 106 in accordance with an embodiment of the invention is now described with a flow diagram of FIG. 2. At block 202, a testing process is initiated by the testing module to test the target component 102 for error handling. The initiation of the testing process may be in response to user input via the user interface of the testing module or in response to some automated control signal. At block 204, the proxy gateway 108 in the target component 102 is activated by the testing module. This step may be language specific. For Java, this step may involve changing the configuration file of the target component to enable the runtime code injection and restarting the component.

Next, at block 206, a call is made by the testing module 106 to the proxy gateway backdoor API to enable the proxy mode. Next, at block 208, the proxy gateway configuration parameters, which dynamically control the proxy gateway runtime behavior, are passed to the proxy gateway 108 from the testing module. Next, at block 210, a negative testing procedure is initiated by the testing module. This step may involve instructing the target component 102 to make a call to one or more remote components 104, which causes a failure that the testing module has configured to occur.

Next, at block 212, a determination is made by the testing module 106 if an additional failure is needed for the testing. If so, then the operation proceeds back to block 208, so that additional proxy configuration parameters can be passed to the proxy gateway and another negative testing procedure can be initiated to cause another failure, which may be a different failure. However, if an additional failure is not needed for the testing, the operation proceeds to block 214.

At block 214, a call is made by the testing module 106 to the proxy gateway backdoor API to disable the proxy mode to exit the testing operation. This will cause the proxy gateway to operate in the non-proxy mode, which means that API calls will now be delegated to the real gateway 110 without modification.

In an embodiment, the proxy gateway 108 may be configured by the testing module 106 with, but not limited to, the following configurations or parameters:

Which API to be supervised, e.g. class name and method name;

Which fault to be injected, which includes the error code and the error message;

Whether the fault should occur synchronously or asynchronously;

Whether the input, the output, or both, needs to be modified and what values need to be used;

What are the criteria to match for API call supervision, e.g. entity ID, name, etc.; and Fine grained control of the proxy gateway's behavior, e.g., how many times the API supervision should be skipped before the test mode is enabled and how many times the API supervision should occur once the supervision has started.

Using these configurations and others, dynamic faults can be injected into the target component 102 using the proxy gateway 108 to test the error handling performance of the target component.

An advantage of using the proxy gateway 108 in the target component 102 is that this design supports fault injection for both synchronous and asynchronous calls. As an example, in an embodiment, when the target component calls an API in the proxy gateway, which is supposed to result in an asynchronous call to the external component, the proxy gateway itself may create a task object and add it to the task table managed by the proxy gateway. The proxy gateway then returns the task to the caller without making the corresponding call to the external component. At the same time, the proxy gateway sets up an internal timer, which updates the progress on the task object and eventually fails the task with the given fault. In another example, when the target component calls an API in the proxy gateway, which is supposed to result in a synchronous call to the external component, the proxy gateway either fails the call immediately with the given fault without calling the external component, or first calls the external component (possibly with modified input parameters) and then modifies the result to induce the given fault or make the result invalid or inconsistent in some manner.

Another advantage of using the proxy gateway 108 in the target component 102 is that the proxy gateway resides in the component being tested and has access to the input and output parameters of any API call in their native form in some embodiments. This allows the proxy gateway to perform intelligent analysis of the context of the API call and inject faults or modify the API's behavior in a very particular and subtle way. Furthermore, the fact that the proxy gateway operates before any network calls are made makes it easy to intercept secure communication channels, for example, SSL encrypted SOAP or HTTP. If the fault injection were to be done between components at the network layer, the proxy would have to be able to decrypt and re-encrypt SSL traffic, which is usually very difficult, especially if both components verify the identity of the peer component.

In summary, the dynamic fault injection technique utilized in the distributed system 100 does not require any network proxy between the target component 102 and the remote components 104. A network proxy would have limited the type of errors that can be used for the testing. In addition, this technique does not require any modification of the remote components, and allows the remote components to be treated as a black box for the purposes of the error handling testing of the target component.

As described above, the remote components 104 of the distributed system 100 are the components on which the target component 102 depends to execute its operations. The remote components can be any processing entities that are designed to perform any operations, depending on the applications for which the remote components were designed to perform.

In an embodiment, the remote components 104 may be components in a cloud computing environment that provide a cloud-based disaster recovery. In this embodiment, the target component 102 is a cloud disaster recovery management application, such as VMware Cloud Availability Manger (CAM), that orchestrates disaster recovery workflows from an on-premise datacenter to a cloud computer environment and back. Some of the remote components may be cloud management applications, such as VMware vCloud Air DR2C nodes and VMware® vCloud Director® (VCD) nodes that communicate directly with the target component to execute various disaster recovery operations, such as replication of virtual machines running on one or more datacenters. Some of the other remote components may be cluster management applications, such as VMware® vCenter™ (VC) Servers, that manage clusters of processing entities (e.g., virtual machines) and hosts, such as VMware® ESX® servers, that host the processing entities. Other remote components may be replication servers, such as VMware Host Based Replication (HBR) servers, and replication management servers, such as VMware Host Based Replication Management Service (HMS) servers.

Error handling testing of a cloud disaster recovery management application that interacts with these types of remote components is challenging because of the various communications made between the cloud disaster recovery management application and the remote components. In describing these challenges, the VMware CAM is used as an example.

Before using the CAM, a user or an administrator is expected to configure Disaster Recovery to Cloud (DR2C) replication for a number of virtual machines (VMs) that need disaster recovery protection. The user then can configure recovery plans in the CAM. A recovery plan is a collection of VMs replicated in the same direction. The user can configure dependencies between the VMs, specify network customization parameters to be used during a failover for each VM, assign guest OS customization scripts to each VM and so on. Once the recovery plan is configured, the user can run various recovery workflows for the recovery plan (planned failover, forced failover, test failover, etc). During the execution of a workflow for a recovery plan, the CAM performs all the necessary steps for each VM with as much parallelism as allowed by the constraints configured by the user (VM dependencies and priority tiers). Executing a workflow typically involves making multiple REST API calls to the vCD and the HCS.

During the workflow execution, the CAM makes multiple calls to the vCD and the HCS. Each of these components typically makes multiple nested calls to the underlying components (vCD to VC and ESX, HCS to HMS, vCD and VC) to achieve the required result. Testing the happy path (e.g. the path with no faults) in the workflow execution in the CAM can be achieved by setting up the environment in a particular way and then triggering the workflow through CAM REST API. However, negative testing is not as straightforward as positive testing. The CAM code needs to react to failures both in the CAM code and in all components it interacts directly with (i.e., vCD and HCS) and even in the components below those (i.e., VC, ESX, HMS etc). Some failure scenarios could be achieved by manipulating the environment in a particular way but most of the failure scenarios could not be achieved only by talking to components through their respective public APIs. Furthermore, some failure scenarios are triggered not by a component returning an explicit error but by returning either an unexpected or an incorrect result.

Another challenge is the presence of synchronous and asynchronous calls. Some APIs are implemented as synchronous calls—the caller is blocked while the server is processing the call. Synchronous calls are typically processed by the server relatively quickly. APIs that require a substantial processing time are implemented as asynchronous calls. For such APIs, when the client makes the call, the server first creates a temporary tracking object usually called a task, then starts processing the call. However, the server completes the call without waiting for the processing to complete. Instead, the server returns the task back to the client. The client starts polling on the task properties, such as progress and completion status, while the server is processing the request and updates these properties. Once the server completes processing the request, it marks the task as completed and assigns the results of the processing to the task. When the client notices that the task has been marked as completed, it retrieves the results of the operation from the task object.

Testing the CAM for error handling with the above challenges is impractical using a network proxy or some modifications of the remote components. However, the use of a proxy gateway, as described above, in the CAM is an effective and efficient solution for error handling testing of the CAM.

Figure 3:
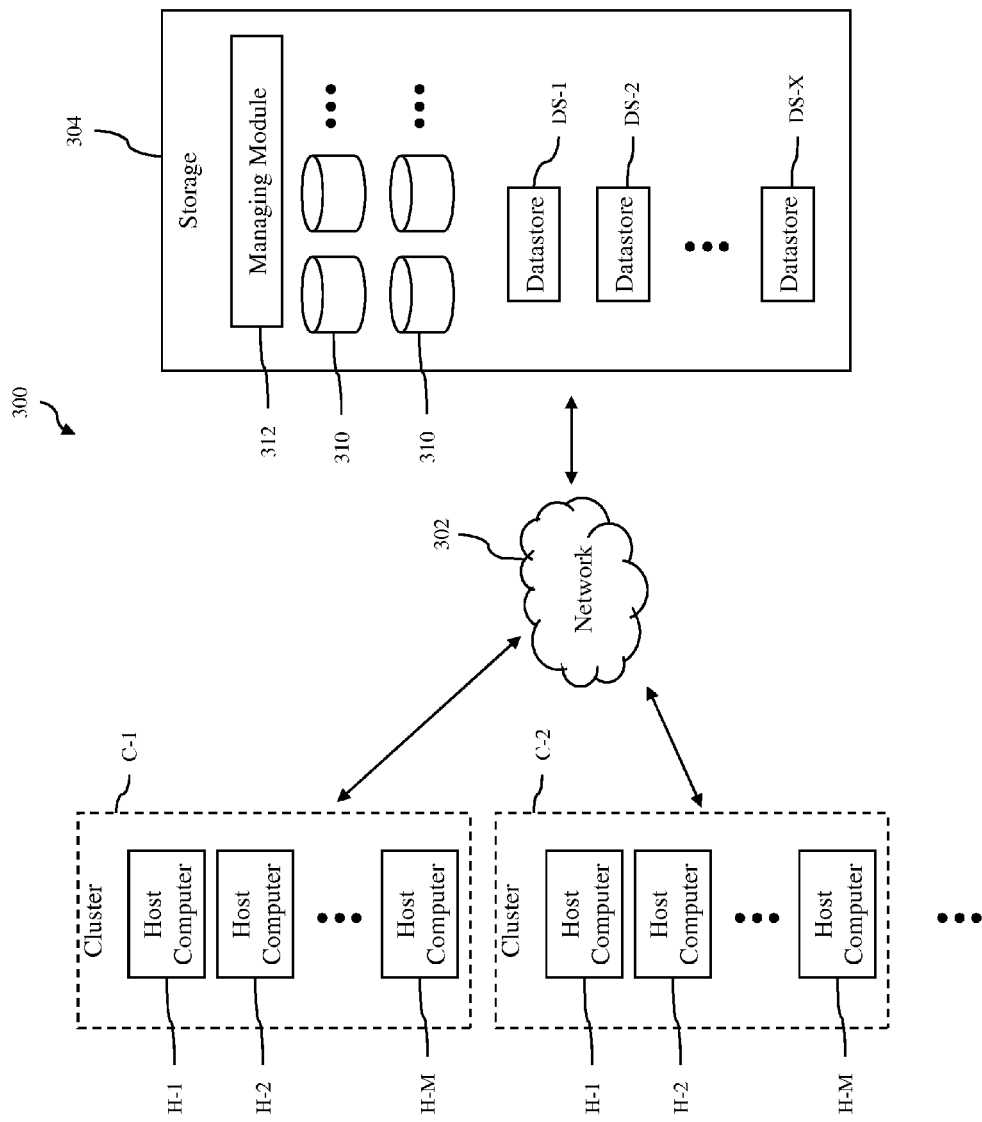
FIG. 3 is a block diagram of a computer infrastructure in accordance with an embodiment of the invention.

In an embodiment, the components 102 and 104 of the distributed system may be implemented as applications running in a physical computing infrastructure. Turning now to FIG. 3, a computing infrastructure 300 that can support the components 102 and 104 in accordance with an embodiment of the invention. As illustrated in FIG. 3, the computing infrastructure includes a network 302, a number of host computer clusters C-1, C-2 . . . , and storage 304. The exact number of host computer clusters included in the distributed computer system can be any number of clusters from one to tens of clusters or more. The host computers of the different clusters and the storage are connected to the network. Thus, each of the host computers in the clusters is able to access the storage via the network and may share the resources provided by the storage. Consequently, any process running on any of the host computers may also access the storage via the network.

In the illustrated embodiment, each of the clusters C-1, C-2 . . . includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more processing entities so that the processing entities are executing on the physical computer systems. As used herein, the term "processing entities" refer to any software entities that can run on a computer system, such as software applications, software processes, virtual machines (VMs) and "containers" that provide system-level process isolation. The host computers may be servers that are commonly found in datacenters. As an example, the host computers may be servers installed in one or more server racks. Typically, the host computers of a cluster are located within the same server rack.

Figure 4:
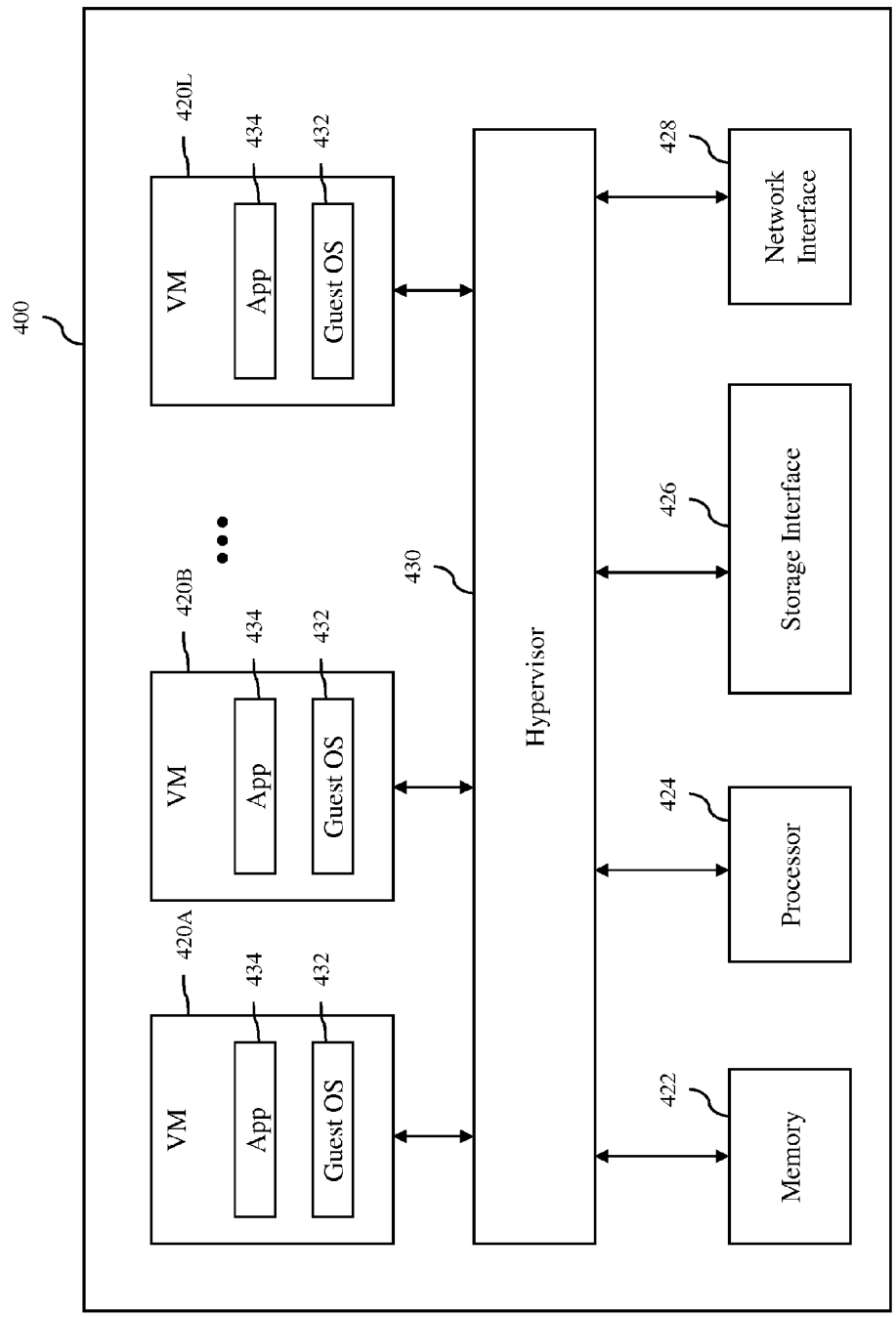
FIG. 4 is a block diagram of a host computer in accordance with an embodiment of the invention.

Turning now to FIG. 4, components of a host computer 400 that is representative of the host computers H-1, H-2 . . . H-M in accordance with an embodiment of the invention are shown. In FIG. 4, the physical connections between the various components of the host computer are not illustrated. In the illustrated embodiment, the host computer is configured to support a number of processing entities 420A, 420B . . . 420L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 422, one or more processors 424, a storage interface 426, and a network interface 428. Each system memory 422, which may be random access memory (RAM), is the volatile memory of the host computer. Each processor 424 can be any type of a processor, such as a central processing unit (CPU) commonly found in a server. In some embodiments, each processor may be a multi-core processor, and thus, includes multiple independent processing units or cores. The storage interface 426 is an interface that allows that host computer to communicate with the storage 304. As an example, the storage interface may be a host bus adapter or a network file system interface. The network interface 428 is an interface that allows the host computer to communicate with other devices connected to the network 302. As an example, the network interface may be a network adapter.

In the illustrated embodiment, the VMs 420A, 420B . . . 420L run on "top" of a hypervisor 430, which is a software interface layer that, using virtualization technology, enables sharing of the hardware resources of the host computer 400 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 432 and one or more guest applications 434. The guest operating system manages virtual system resources made available to the corresponding VM by the hypervisor, and, among other things, the guest operating system forms a software platform on top of which the guest applications run.

Similar to any other computer system connected to the network 302, the VMs 420A, 420B . . . 420L are able to communicate with other computer systems connected to the network using the network interface 428 of the host computer 400. In addition, the VMs are able to access the storage 304 using the storage interface 426 of the host computer.

Turning back to FIG. 3, the network 302 can be any type of computer network or a combination of networks that allows communications between devices connected to the network. The network 302 may include the Internet, a wide area network (WAN), a local area network (LAN), a storage area network (SAN), a fibre channel network and/or other networks. The network 302 may be configured to support protocols suited for communications with storage arrays, such as Fibre Channel, Internet Small Computer System Interface (iSCSI), Fibre Channel over Ethernet (FCoE) and HyperSCSI.

The storage 304 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 310, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 312, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The components 102 and 104 of the distributed system 100 may be implemented in any of the host computers H-1, H-2 . . . H-M in the clusters C-1, C-2 . . . as applications running on those host computers. In some embodiments, one or more of the components may be running in the processing entities, e.g., VMs, being hosted in the host computers.

Figure 5:
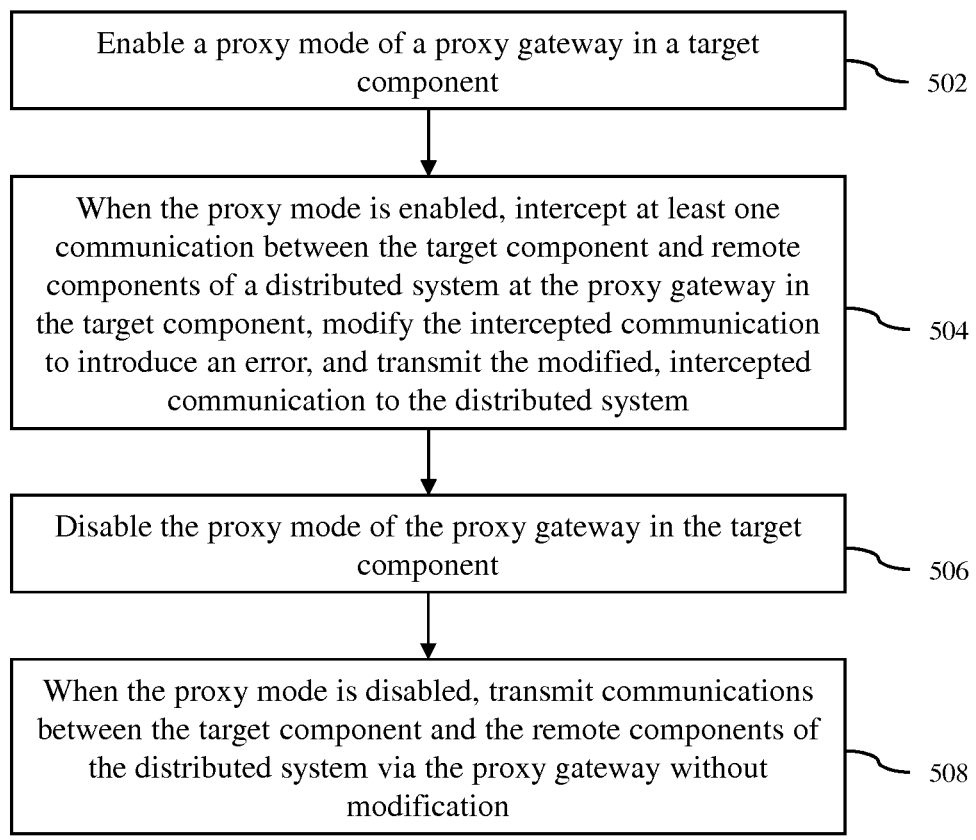
FIG. 5 is a flow diagram of a method for error handling testing of a target component in a distributed system with multiple components in accordance with an embodiment of the invention.

A method for error handling testing of a target component in a distributed system with multiple components in accordance with an embodiment of the invention is now described with reference to the process flow diagram of FIG. 5. At block 502, a proxy mode of a proxy gateway in the target component is enabled. At block 504, when the proxy mode is enabled, at least one communication between the target component and remote components of the distributed system is intercepted at the proxy gateway in the target component, the intercepted communication is modified to introduce an error, and the modified, intercepted communication is transmitted to the distributed system. At block 506, the proxy mode of the proxy gateway in the target component is disabled. At block 508, when the proxy mode is disabled, communications between the target component and the remote components of the distributed system are transmitted via the proxy gateway without modification.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times. For example, a testing process may choose to enable the proxy mode, disable the proxy mode, and re-enable the proxy mode, depending on which part of the workflow being tested is in need of a pre-determined fault.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for error handling testing of a target component in a distributed system with multiple components, the method comprising:
    enabling a proxy mode of a proxy gateway in the target component;
    when the proxy mode is enabled,
    intercepting at least one communication between the target component and remote components of the distributed system at the proxy gateway in the target component,
    modifying the intercepted communication to introduce an error, and transmitting the modified, intercepted communication to the distributed system;

disabling the proxy mode of the proxy gateway in the target component; and when the proxy mode is disabled, transmitting communications between the target component and the remote components of the distributed system via the proxy gateway without modification.

2. The method of claim 1, wherein modifying the intercepted communication includes modifying an input parameter of a call from the target component to a remote component such that the remote component will fail the call so that a corresponding fault can be induced.

3. The method of claim 2, wherein a value of the input parameter of the call to be performed by the remote component and wherein modifying the input parameter of the call includes changing the value of the input parameter in a predefined manner so that the remote component generates the corresponding fault in response to the call.

4. The method of claim 1, wherein modifying the intercepted communication includes adding an artificial delay in a call from the target component to a remote component so that a timed-out fault can be induced.

5. The method of claim 1, further comprising, when the proxy mode is enabled, modifying a communication from one of the remote components to the target component so that the communication is incorrect or unexpected.

6. The method of claim 1, further comprising, when the proxy mode is enabled, managing an instruction to make an asynchronous call to one of the remote components at the proxy gateway without making the asynchronous call to that remote component, including subsequently failing a task associated with the asynchronous call.

7. The method of claim 1, wherein the proxy gateway is implemented as a piece of code in the form of a small wrapper that wraps the gateway and provides the same Application-Programming Interface (API) interface as the gateway.

8. A non-transitory computer-readable storage medium containing program instructions for a method for error handling testing of a target component in a distributed system with multiple components, wherein execution of the program instructions by one or more processors of a computer system causes the one or more processors to perform steps comprising:

enabling a proxy mode of a proxy gateway in the target component;

when the proxy mode is enabled, intercepting at least one communication between the target component and remote components of the distributed system at the proxy gateway in the target component, modifying the intercepted communication to introduce an error, and transmitting the modified, intercepted communication to the distributed system;

disabling the proxy mode of the proxy gateway in the target component; and when the proxy mode is disabled, transmitting communications between the target component and the remote components of the distributed system via the proxy gateway without modification.

9. The non-transitory computer-readable storage medium of claim 8, wherein modifying the intercepted communication includes modifying an input parameter of a call from the target component to a remote component such that the remote component will fail the call so that a corresponding fault can be induced.

10. The non-transitory computer-readable storage medium of claim 9, wherein a value of the input parameter of the call to be performed by the remote component and wherein modifying the input parameter of the call includes changing the value of the input parameter in a predefined manner so that the remote component generates the corresponding fault in response to the call.

11. The non-transitory computer-readable storage medium of claim 10, wherein modifying the intercepted communication includes adding an artificial delay in a call from the target component to a remote component so that a timed-out fault can be induced.

12. The non-transitory computer-readable storage medium of claim 10, further comprising, when the proxy mode is enabled, modifying a communication from one of the remote components to the target component so that the communication is incorrect or unexpected.

13. The non-transitory computer-readable storage medium of claim 10, wherein the steps further comprises, when the proxy mode is enabled, managing an instruction to make an asynchronous call to one of the remote components at the proxy gateway without making the asynchronous call to that remote component, including failing a task associated with the asynchronous call.

14. The non-transitory computer-readable storage medium of claim 10, wherein the proxy gateway is implemented as a piece of code in the form of a small wrapper that wraps the gateway and provides the same Application-Programming Interface (API) interface as the gateway.

15. A distributed system with multiple components running on physical computer systems, the distributed system comprising:

a target component including a proxy gateway, a testing module operably coupled to the target component, a physical processor; and a non-transitory computer readable medium having stored thereon program code, the program code causing the processor to:

cause the target component to intercept communications to and from remote components of the distributed system, and cause the proxy gateway to transmit the communications without modification when a proxy mode of the proxy gateway is disabled; and cause the testing module to enable and disable the proxy mode of the proxy gateway in the target component, and facilitate a modification of at least one of the communications at the proxy gateway to introduce an error when the proxy mode is enabled.

16. The distributed system of claim 15, wherein the program code further causes the proxy gateway of the target component to modify an input parameter of a call from the target component to a remote component such that the remote component will fail the call so that a corresponding fault can be induced.

17. The distributed system of claim 15, wherein the program code further causes the proxy gateway of the target component to add an artificial delay in a call from the target component to a remote component so that a timed-out fault can be induced.

18. The distributed system of claim 15, wherein the program code further causes the proxy gateway of the target component to modify a communication from one of the remote components to the target component so that the communication is incorrect or unexpected.

19. The distributed system of claim 15, wherein the proxy gateway is implemented as a piece of code in the form of a small wrapper that wraps the gateway and provides the same Application-Programming Interface (API) interface as the gateway.

* * * * *